(12) United States Patent
Gorodisher et al.

(10) Patent No.: US 10,894,905 B2
(45) Date of Patent: Jan. 19, 2021

(54) HALOGEN AND POLYHALIDE MEDIATED PHENOLIC POLYMERIZATION

(71) Applicant: 3M INNOVATIVE PROPERTIES COMPANY, St. Paul, MN (US)

(72) Inventors: Ilya Gorodisher, Stillwater, MN (US); Gregory P. Sorenson, Maplewood, MN (US); Guy D. Joly, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/323,573

(22) PCT Filed: Aug. 23, 2017

(86) PCT No.: PCT/IB2017/055085
§ 371 (c)(1),
(2) Date: Feb. 6, 2019

(87) PCT Pub. No.: WO2018/042290
PCT Pub. Date: Mar. 8, 2018

(65) Prior Publication Data
US 2019/0177587 A1    Jun. 13, 2019

Related U.S. Application Data

(60) Provisional application No. 62/381,626, filed on Aug. 31, 2016.

(51) Int. Cl.
| | | |
|---|---|---|
| *C09K 3/00* | (2006.01) | |
| *C09K 3/14* | (2006.01) | |
| *B24D 3/28* | (2006.01) | |
| *C08G 8/10* | (2006.01) | |
| *C08G 8/04* | (2006.01) | |
| *C08G 8/22* | (2006.01) | |
| *C08G 8/20* | (2006.01) | |
| *C08G 8/24* | (2006.01) | |

(52) U.S. Cl.
CPC .......... *C09K 3/1436* (2013.01); *B24D 3/285* (2013.01); *C08G 8/04* (2013.01); *C08G 8/10* (2013.01); *C08G 8/20* (2013.01); *C08G 8/22* (2013.01); *C08G 8/24* (2013.01)

(58) Field of Classification Search
CPC .......... C09K 3/14; C09K 3/1436; B24D 3/00; B24D 3/285; C08G 8/04; C08G 8/10; C08G 8/20; C08G 8/22; C08G 8/24; C08G 67/06; C08G 69/00
See application file for complete search history.

(56) References Cited

U.S. PATENT DOCUMENTS

| | | | |
|---|---|---|---|
| 1,587,270 A | 6/1926 | Beebe | |
| 2,191,587 A * | 2/1940 | Rothrock | ............... C08G 65/40 525/534 |
| 2,485,711 A * | 10/1949 | Doelling | ................. C08G 8/20 528/153 |
| 2,958,593 A | 11/1960 | Hoover | |
| 4,018,575 A | 4/1977 | Davis | |
| 4,227,350 A | 10/1980 | Fitzer | |
| 4,314,827 A | 2/1982 | Leitheiser | |
| 4,331,453 A | 5/1982 | Dau | |
| 4,433,119 A * | 2/1984 | Brode | ..................... C07C 43/30 425/543 |
| 4,609,380 A | 9/1986 | Barnett | |
| 4,623,364 A | 11/1986 | Cottringer | |
| 4,652,275 A | 3/1987 | Bloecher | |
| 4,734,104 A | 3/1988 | Broberg | |
| 4,744,802 A | 5/1988 | Schwabel | |
| 4,748,043 A | 5/1988 | Seaver | |
| 4,751,137 A | 6/1988 | Halg | |
| 4,770,671 A | 9/1988 | Monroe | |
| 4,800,685 A | 1/1989 | Haynes, Jr. | |
| 4,870,154 A | 9/1989 | Saeki | |
| 4,881,951 A | 11/1989 | Wood | |
| 4,898,597 A | 2/1990 | Hay | |
| 4,933,373 A | 6/1990 | Moren | |
| 4,991,362 A | 2/1991 | Heyer | |
| 5,137,542 A | 8/1992 | Buchanan | |
| 5,152,917 A | 10/1992 | Pieper | |
| 5,178,646 A | 1/1993 | Barber, Jr. | |
| 5,201,916 A | 4/1993 | Berg | |
| 5,213,591 A | 5/1993 | Celikkaya | |
| 5,282,875 A | 2/1994 | Wood | |

(Continued)

FOREIGN PATENT DOCUMENTS

WO     WO 2018-051268     3/2018

OTHER PUBLICATIONS

Petsom et al. "Brominated Phenol-Formaldehyde Resin as an Adhesive for Plywood", Journal of Applied Polymer Science, vol. 89, 1918-1924 (2003) Wiley Periodicals, Inc. (Year: 2003).*

(Continued)

*Primary Examiner* — Alexandra M Moore

(57) ABSTRACT

A catalyst for use with a phenolic resins which imparts accelerated curing at reduced temperatures. The catalyst is selected from elemental halogen or opium polyhalide compounds of the general formula:

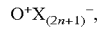

where $1 \leq n \leq 4$, Q is onium group, preferably selected from ammonium, sulfonium and phosphonium; and X is a halide. Each X may be the same or different and may include mixed halides such a $X = Br_2Cl$ or $Cl_2Br$.

10 Claims, No Drawings

(56) References Cited

U.S. PATENT DOCUMENTS

| | | | |
|---|---|---|---|
| 5,290,843 A * | 3/1994 | McDonald | C08G 8/28 428/117 |
| 5,366,523 A | 11/1994 | Rowenhorst | |
| 5,399,596 A * | 3/1995 | Kouge | C08F 2/50 522/31 |
| 5,417,726 A | 5/1995 | Stout | |
| 5,435,816 A | 7/1995 | Spurgeon | |
| 5,462,797 A | 10/1995 | Williams | |
| 5,554,068 A | 9/1996 | Carr | |
| 5,573,619 A | 11/1996 | Benedict | |
| 5,591,239 A | 1/1997 | Larson | |
| RE35,570 E | 7/1997 | Rowenhorst | |
| 5,672,097 A | 9/1997 | Hoopman | |
| 5,681,361 A | 10/1997 | Sanders, Jr. | |
| 5,712,210 A | 1/1998 | Windisch | |
| 5,858,140 A | 1/1999 | Berger | |
| 5,859,153 A | 1/1999 | Kirk | |
| 5,928,070 A | 7/1999 | Lux | |
| 5,942,015 A | 8/1999 | Culler | |
| 5,946,991 A | 9/1999 | Hoopman | |
| 5,975,987 A | 11/1999 | Hoopman | |
| 5,984,988 A | 11/1999 | Berg | |
| 6,017,831 A | 1/2000 | Beardsley | |
| 6,129,540 A | 10/2000 | Hoopman | |
| 6,207,246 B1 | 3/2001 | Moren | |
| 6,261,682 B1 | 7/2001 | Law | |
| 6,302,930 B1 | 10/2001 | Lux | |
| 8,034,137 B2 | 10/2011 | Erickson | |
| 8,142,531 B2 | 3/2012 | Adefris | |
| 8,142,532 B2 | 3/2012 | Erickson | |
| 8,142,891 B2 | 3/2012 | Culler | |
| 2009/0149624 A1 | 6/2009 | Pullichola | |
| 2009/0165394 A1 | 7/2009 | Culler | |
| 2009/0169816 A1 | 7/2009 | Erickson | |
| 2012/0227333 A1 | 9/2012 | Adefris | |
| 2013/0040537 A1 | 2/2013 | Schwabel | |
| 2013/0125477 A1 | 5/2013 | Adefris | |
| 2015/0004396 A1 | 1/2015 | Elgimiabi | |

OTHER PUBLICATIONS

Deetlefs, "Neoteric optical media for refractive index determination of gems and minerals", New Journal of Chemistry, Mar. 2006, vol. 30, No. 3, pp. 317-326.

Fei, "Influence of Elemental Iodine on Imidazolium-Based Ionic Liquids: Solution and Solid-State Effects", Inorganic Chemistry, 2015, vol. 54, No. 21, pp. 10504-10512.

Ghammamy, "Synthesis and characterization of two new halo complexes of iodine: $(C_4H_9)_4N[I_2Br]$ and $(C_4H_9)_4N[I_2Cl]$ and theoretical calculations of their structures", Main Group Chemistry, Dec. 2009, vol. 8, No. 4, pp. 299-306.

Jaratjaroonphong, "Iodine catalyzed Friedel-Crafts alkylation of electron-rich arenes with aldehydes: efficient synthesis of triarylmethanes and diarylalkanes", Tetrahedron Letters, 2009, vol. 50, pp. 6012-6015.

Srihari, "Iodine-Catalyzed Nucleophilic Substitution Reactions of Benzylic Alcohols", SYNLETT, 2008, No. 7, pp. 1045-1049.

International Search Report for PCT International Application No. PCT/IB2017/055085, dated Nov. 17, 2017, 4 pages.

* cited by examiner

HALOGEN AND POLYHALIDE MEDIATED PHENOLIC POLYMERIZATION

CROSS REFERENCE TO RELATED APPLICATIONS

This application is a national stage filing under 35 U.S.C. 371 of PCT/IB2017/055085, filed Aug. 23, 2017, which claims the benefit of U.S. Application No. 62/381,626, filed Aug. 31, 2016, the disclosure of which is incorporated by reference in its/their entirety herein.

FIELD OF THE INVENTION

The present invention relates to phenolic resin compositions and more particularly to a catalyst for use with a phenolic resin, which imparts accelerated curing at reduced temperatures.

BACKGROUND

Of the many thermally curable resins, phenolic resins are used extensively to manufacture abrasive articles, brake binders, wood adhesives, and electrical and thermal insulators because of their thermal properties, availability, low cost, slow cure, and ease of handling.

There are two basic types of phenolic resins: resole and novolac phenolic resins. The prior art uses strong bases as conventional catalysts for the curing of resole resins. Alkaline catalysts suitable for catalyzing the reaction between aldehyde and phenolic components of resole phenolic resins include sodium hydroxide, barium hydroxide, potassium hydroxide, calcium hydroxide, organic amines, and sodium carbonate, all as solutions of the catalyst dissolved in water. Typical commercially available phenolic resins have 2% by weight of phenolic of alkaline catalyst. Typically, additional catalyst solution comprising a 50% (wt. % of total) solution of sodium hydroxide (NaOH) in water may be added to adjust water tolerance and further aid advancing the resin molecular weight. The molar ratio of aldehyde to phenolic is greater than or equal to 1.0, typically between 1.0 and 3.0.

With novolac resins, the molar ratio of phenolic to aldehyde is greater than or equal to 1.0, typically between 1.0 and 3.0. The conventional catalysts for curing phenolic novolac resins are variety of strong acids. These catalysts include, for example, mineral acids including sulfuric acid and phosphoric acid, halogen acids such as hydrochloric acid, sulfonic acids such as para-toluene sulfonic acid; and other organic acids including chlorinated acetic acids, oxalic acid and maleic acid. Typical acid concentrations for catalyzing novolac resins have ranged in the past from about 2 to 20 weight percent (active acid basis). It also is known that certain ammonium salts of these acids, which produce the acid upon heating, also can be used, e.g., ammonium sulfate and ammonium chloride. While such ammonium salts generally provide compositions of adequate storage stability or pot life, quite high temperatures normally are needed to obtain an adequate rate of cure.

Conventional catalysts for both classes are corrosive to manufacturing equipment, and present challenges in resin manufacture. In particular, they require high temperatures to effect the cure. Other catalysts have been proposed, but may require higher cure temperatures, are more expensive, may be consumed in the polymerization and lack sufficient solubility in the reaction mixture The compositions of the present invention alleviate these deficiencies by use of a catalyst comprising an elemental halogen or quaternary ammonium polyhalide. Curable compositions containing the catalyst are effective with phenolic monomers (i.e. a phenols and aldehyde equivalents), prepolymers such as phenolic resoles, or for the final cure of both novolac and resole resins with or without added aldehyde equivalents.

SUMMARY

The present disclosure provides phenolic resins prepared from a phenolic compound, and aldehyde compound and a catalyst comprising an elemental halogen or an onium polyhalide compound.

The present invention is directed to a catalyzed phenolic resin composition containing a thermosetting phenolic resin and a catalyst comprising an elemental halogen or a quaternary ammonium polyhalide compound.

The catalyst may be an onium polyhalide of the general formula:

where $1 \leq n \leq 4$,
Q is onium group, preferably selected from ammonium, sulfonium and phosphonium; and
X is a halide. Each X may be the same or different and may include mixed halides such a $X=Br_2Cl$ or $Cl_2Br$.

In some embodiments Q may be selected from quaternary amines of the formula: $(R^1)_4N^+$, sulfonium groups of the formula $(R^1)_3S^+$ or phosphonium groups of the formula $(R^1)_4P^+$
wherein each $R^1$ is independently H, (hetero)alkyl, (hetero)aryl, or combinations thereof with the proviso that no more than one $R^1$ is H.

In some alternate embodiments, Q may be selected from organometallic cations such as are described in U.S. Pat. No. 5,462,797 (Williams et al.), incorporated herein by reference. One preferred organometallic cation is ferrocenium.

In some embodiment Q may be an ammonium group selected from pyrrolidinium, pyridinium or imidazolinium groups of the formulas.

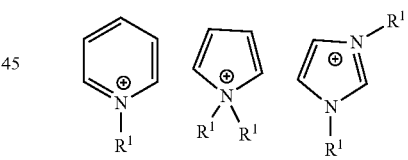

wherein each $R^1$ is independently H, alkyl, aryl, or combinations thereof with the proviso that no more than one $R^1$ is H.

Preferably, Q may be selected from quaternary amines of the formula:

wherein each $R^1$ is independently H, alkyl, aryl, or combinations thereof with the proviso that no more than one $R^1$ is H.

Examples of the quaternary ammonium polyhalides that can be used as cathode-active materials in the present invention include tetramethylammonium trichloride, tetramethylammonium tribromide, tetramethylammonium chlorodibromide, tetramethylammonium ioodibromide, tetraethylammonium trichloride, tetraethylammonium tribromide, and tetraethylammonium chlorodibromide.

The quaternary ammonium polyhalides are made by adding molecular iodine bromine or chlorine or bromine chloride to a quaternary ammonium halide salt. Reference may be made to S. Ghammany et al., Synthesis and characterization of two new halo complexes of iodine:$(C_4H_9)_4N[I_2Br]_7$ and $(C_4H_9)_4N[I_2Cl]_7$ and theoretical calculations of their structures, Main Group Chemistry, vol. 8, No. 4, December 2009, 299-306.

In some known methods, the onium polyhalides may be made by aqueous techniques by adding $I_2$, $Cl_2$, $Br_2$ (or mixed halides) to a concentrated aqueous solution of the appropriate quaternary ammonium halide salt. The amount of water used should be sufficient to dissolve all of the quaternary ammonium halide salt, but should be otherwise kept at a minimum to prevent yield losses due to the solubility of the product in water. The bromine should be added at a rate sufficiently slow to prevent excess bromine from pooling on the bottom of the reaction vessel during the initial stages of the reaction. The quaternary ammonium polyhalide separates from the solution as a deep red liquid layer. The temperature of the reaction should be sufficient to keep the polyhalide liquid, but below the temperature at which bromine is released from the complex. A suitable temperature range is from about 10° C. to about 90° C.

Imidazolium polyhalides may be prepared by mixing an imidazolium halide with an $I_2$, $Cl_2$ or $Br_2$ as described in M. Deetlefs et al., Neoteric optical media for refractive index determination of gems and minerals, New Journal of Chemistry, 2006, 30, 317-326.

The preparation of onium polyiodides may be accomplished by procedures similar to those described in P. Dyson et al., Influence of Elemental Iodine on Imidazolium-Based Ionic Liquids: Solution and Solid-State Effects, Inorg. Chem., 2015, 54, 10504-10512. DOI 10.1021/acs.inorgchem.5b02021.

Methods for preparation of the quaternary ammonium halide salt precursors are known to those skilled in the art. The primary methods are by reaction of tertiary amine with an appropriate alkyl halide, halogenated alkyl ether, or epoxide in the presence or absence of a solvent. The reaction of tertiary amines with epoxides in aqueous media produces a quaternary ammonium hydroxide, which is neutralized with mineral acid (H—X) to give the quaternary ammonium halide. The halide ion $X^-$ that complexes with bromine to form the polyhalide ion $XBr_2$— is determined in this case by the mineral acid H—X used to neutralize the reaction. If the quaternary ammonium halide salt is prepared in an aqueous solution the polyhalide may be prepared directly using the aqueous solution without isolation of the quaternary ammonium salt intermediate.

In a typical preparation, an aqueous solution of the tertiary amine is vigorously, stirred with a stoichiometric amount of alkyl halide, the latter being present as a second liquid layer. The time required for complete reaction is dependent upon the nature of the alkyl halide and increases in the order R—I<R-Br<R-Cl. A sealed reaction vessel may be used to prevent loss of volatile reagents in the event that temperatures above the boiling point of the reagents are needed. The reaction is complete when the alkyl halide is consumed and is indicated by the disappearance of the second liquid layer from the reaction vessel.

The elemental halogen or the quaternary ammonium polyhalide is generally used in amounts of 0.1 to 20% by mass relative to the total composition, preferably in amounts of 0.5 to 10%0/by mass

DETAILED DESCRIPTION

In some embodiments, a phenolic resin may be prepared by combining a phenolic compound, and aldehyde compound and the catalyst, including elemental halogen and a quaternary ammonium polyhalide.

Useful phenols include both monohydric and polyhydroxy phenols and include phenol, alkyl substituted phenols, aryl substituted phenols, cycloalkyl substituted phenols, alkenyl-substituted phenols, alkoxy substituted phenols, aryloxy substituted phenols, and halogen-substituted phenols, the foregoing substituents possibly containing from 1 to 26, and preferably from 1 to 9, carbon atoms.

Polyhydroxy phenols include resorcinol, bisphenol-A, phloroglucinol, pyrogallol and the like, with resorcinol being particularly preferred.

Specific examples of suitable phenols for preparing the resole resin composition of the present invention include phenol, o-cresol, m-cresol, p-cresol, 3,5-xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Ordinary phenol normally is preferred for most applications.

Aldehydes that are useful in forming the thermally curable resins useful in the coatable, thermally curable binder precursor solutions of the present invention include cyclic, straight and branched chain alkyl aldehydes, which can be saturated or unsaturated, and aromatic aldehydes. Preferably, the aldehydes have molecular weight below about 300 to afford a less viscous solution. Examples of suitable aldehydes include formaldehyde, benzaldehyde, propanol, hexanal, cyclohexane carboxaldehyde, acetaldehyde, butyraldehyde, valeraldehyde, and other low molecular weight aldehydes. Preferred is formaldehyde, for its availability, low cost, cured resin properties, and because it affords low viscosity binder precursor solutions.

The aldehyde component reacted with the phenol component similarly can include any of the aldehydes or their equivalents heretofore employed in the formation of phenolic resole resins including, for example, formaldehyde, acetaldehyde, propionaldehyde, furfuraldehyde, and benzaldehyde. In general, the aldehydes employed have the formula R'CHO wherein R' is a hydrogen or hydrocarbon radical generally of 1-8 carbon atoms. It will be appreciated that some aldehydes, e.g, acetaldehyde and butyraldehyde, improve toughness of the resole resin at the expense of lowering the HDT thereof (heat distortion temperatures, as determined by American Society for Testing and Materials ASTM D-648). In addition, it is contemplated that difunctional aldehydes can be used to prepare the phenolic resin, and could advantageously be used to introduce cross-links into the cured resin Again, ordinary formaldehyde is preferred for most applications. Formaldehyde can be supplied in any one of its commonly available forms including formalin solutions and paraformaldehyde It will be further understood that the aldehyde compound may be a latent aldehyde compound with release an aldehyde in situ in the reaction mixture. Examples of latent aldehydes include ketals and trimers of aldehydes and include paraformaldehyde, metaformaldehyde or hexamethylenetetramine The present disclosure further provides a curable composition comprising a phenolic resin, including novolac resins and resole resins and the catalyst. The terms "phenolic resole resin" and "phenolic novolac resin" are terms of the phenolic resin art. Resoles are thermosetting, i.e. they form an infusible three-dimensional polymer upon the application of heat, and are formed by condensing a phenol with a molar excess of aldehyde in the presence of a basic catalyst. Phenol-aldehyde novolac resins, on the other hand, are phenol ended chain polymers formed by the reaction of an aldehyde with a molar excess of a phenol typically in the presence of an acidic catalyst. These novolac resins are permanently fusible non-curing resins, which conventionally cure into an insoluble, infusible resin by reaction with a curing agent such as hexamethylenetetramine at elevated temperature. Typically, hexamethylenetetramine ("hexa") is commonly used and is blended with resin in finely divided form. Under the influence of heat, the hexa breaks down into formaldehyde and ammonia and formaldehyde reacts with novolac causing it to cure. Many other curing agents other than hexa are described in the literature such as ethylenediamine-formaldehyde products, formaldehyde-aniline, and methylol derivatives of urea or melamine, paraformaldehyde, etc.

Both the resole and novolac phenolic resins (including resolated novolacs) are curable by heat in the presence of the instant catalyst. Novolac phenolic resins require a source of an aldehyde to effect cure, such as hexamethylene tetramine or a resole. Phenolic resins are well known and readily available from commercial sources. Examples of commercially available novolac resins include DUREZ 1364, a two-step, powdered phenolic resin (marketed by Durez Corporation, Addison, Tex., under the trade designation VARCUM (e.g., 29302), or HEXION AD5534 RESIN (marketed by Hexion Specialty Chemicals, Inc., Louisville, Ky.). Examples of commercially available resole phenolic resins useful in practice of the present disclosure include those marketed by Durez Corporation under the trade designation VARCUM (e.g., 29217, 29306, 29318, 29338, 29353); those marketed by Ashland Chemical Co., Bartow, Fla. under the trade designation AEROFENE (e.g., AEROFENE 295); and those marketed by Kangnam Chemical Company Ltd., Seoul, South Korea under the trade designation "PHENOLITE" (e.g., PHENOLITE TD-2207).

The compositions may further comprise adjuvants such thermoplastic resins, reactive diluents, thixotropic agents, pigments, flame retardants, antioxidants, secondary curatives, catalysts and the like.

Thixotropic agents can be added to the compositions to prevent the composition from having a water-like consistency or viscosity. Thixotropic agents typically are particulate materials having particle sizes of less than 50 nm. Preferred thixotropic agents include fumed silica. Thixotropic agents are commercially available under the trade designation Cab-O-Sil from Cabot, Schwalbach im Taunus, Germany, or Aerosil from Degussa Evonik GmbH, Frankfurt, Germany. Typically, they may be present in an amount of up to 5% wt or up to 10% by weight based on the total curable composition.

Reactive diluents are monomeric isocyanate-, benzoxazine-, benzoxazole- or epoxy-containing molecules.

In some preferred embodiments, the reactive diluent is an epoxy. Preferably, they have a saturated or unsaturated cyclic backbone. Preferred reactive terminal ether portions include glycidyl ether. Examples of suitable diluents include the diglycidyl ether of resorcinol, diglycidyl ether of cyclohexane dimethanol, diglycidyl ether of neopentyl glycol, triglycidyl ether of trimethylolpropane. Glycidol, allyl glycidyl ether, methyl glycidyl ether, butyl glycidyl ether, phenyl glycidyl ether and the like; and a compound having an allyl group such as diallylphthalate, o,o'-diallyl bisphenol A, bisphenol A diallylether. Commercially available reactive diluents are for example "Reactive Diluent 107" from Hexion or "Epodil 757" from Air Products and Chemical Inc, Allentown, Pa., USA.

Reactive diluents may be added in amounts up to 15%, preferably 0.1 to 10%, by weight based on the total curable composition, 0.1 wt. % or more rather results in bringing sufficient effect as a reactive diluent and the content of 10 wt. % or less results in bringing good workability without excessively reducing the viscosity of the resin composition.

The compositions provided herein may further comprise a fire-retardant system that includes a mixture of: (1) at least one compound selected from the group comprising alkaline earth metal hydroxides and aluminium group hydroxides, and (2) at least one phosphorous-containing material. Typically, the compositions comprise the fire-retardant system of (1) and (2) above from 2 to 50 wt. % and preferably from 10 to 50 wt. % based on the total composition.

A thermoplastic resin is not particularly restricted. However, as desirable examples, there can be mentioned polyether sulfone, polysulfone, polyphenylene sulfide, polyetherether ketone, polyimide, polyetherimide, polyamideimide, aromatic polyamide, polyprabanic acid, polyphenylene ether, phenoxy resin, further liquid crystal polymer such as aromatic polyester and the like having the molecular weight of 5000 to 100000. Furthermore, the thermoplastic resin grafted with carboxyl group, hydroxyl group, alkene group and the like on the end or chain side can be more properly used. When the molecular weight of the thermoplastic resins is not less than 5000, there is the effect of granting flexibility. When the molecular weight is not more than 100000, the viscosity does not become excessively high so that moldability becomes sufficient. Therefore, the molecular weight of the thermoplastic resins is preferably not more than 5000 and not less than 100000.

The content of the thermoplastic resin is preferably 0.1 to 30 wt. % to the resin component of the aforementioned resin composition. If the content of not less than 0.1 wt. %, the effect of addition can be obtained. If the content is not more than 30 wt. %, heat resistance of the resin composition can be maintained.

The composition may be coated onto substrates at useful thicknesses ranging from 25-500 micrometers or more. Coating can be accomplished by any conventional means such as roller, dip, knife, or extrusion coating. Solutions of the curable composition may be used to facilitate coating. Stable thicknesses are necessary to maintain the desired coating thickness prior to crosslinking of the composition to form the crosslinked composition.

Useful substrates can be of any nature and composition, and can be inorganic or organic. Representative examples of useful substrates include ceramics, siliceous substrates including glass, metal, natural and man-made stone, woven and nonwoven articles, polymeric materials, including thermoplastic and thermosets, (such as polymethyl (meth)acrylate), polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood and composites of the foregoing materials.

The present disclosure further provides abrasive articles using the curable composition as a binder, which secures abrasive grains to a backing sheet, on fibers of a fibrous mat, or in a shaped mass.

Abrasive articles may be categorized as coated, bonded, and nonwoven abrasives. Coated abrasives generally comprise a flexible backing upon which an abrasive coating comprising abrasive grains and a binder is attached. The backing can be selected from paper, cloth, film, vulcanized fiber, etc. or a combination of one or more of these materials, or treated versions thereof. The abrasive grains can be formed of flint, garnet, aluminum oxide, alumina zirconia, ceramic aluminum oxide, diamond, silicon carbide, etc. Binders commonly comprise cured versions of hide glue or varnish, or one or more resins such as phenolic, urea-formaldehyde, melamine-formaldehyde, urethane, epoxy, and acrylic resins. Phenolic resins include those of the phenol-aldehyde type.

Nonwoven abrasive articles typically comprise a fibrous mat of fibers, which have on at least a portion of their surface an abrasive coating comprising abrasive grains and a binder. The fibers can be formed from various polymers, including polyamides, polyesters, polypropylene, polyethylene, and various copolymers. Naturally occurring fibers such as cotton, wool, bast fibers and various animal hairs may also be suitable.

Coated and nonwoven abrasives may employ a "make" coating of binder precursor solution, which includes one or more of the above-named resins, in order to secure the abrasive grains to the backing when the resin is cured as well as to orient the abrasive grains on the backing or throughout the lofty fibrous mat. A "size" coating of resinous binder material can be applied over the make coating and abrasive grains in order to firmly bond the abrasive grains to the backing or fibrous mat. The resin of the size coating can be the same as the resin of the make coating or a different material.

In the manufacture of coated and nonwoven abrasives, the make coating and abrasive grains are usually first applied to the backing or lofty fibrous mats, the make coating partially cured, then the size coating is applied, and finally the make and size coatings are fully cured.

Useful abrasive materials include, for example, fused aluminum oxide, heat treated aluminum oxide, white fused aluminum oxide, ceramic aluminum oxide materials such as those commercially available as 3M CERAMIC ABRASIVE GRAIN from 3M Company of St. Paul, Minn., black silicon carbide, green silicon carbide, titanium diboride, boron carbide, tungsten carbide, titanium carbide, cubic boron nitride, diamond, garnet, fused alumina zirconia, sol-gel derived ceramics (e.g., alumina ceramics doped with chromia, ceria, zirconia, titania, silica, and/or tin oxide), silica (e.g., quartz, glass beads, glass bubbles and glass fibers), feldspar, or flint. Examples of sol-gel derived crushed abrasive particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.).

Further details concerning methods of making sol-gel-derived abrasive particles can be found in, for example, U.S. Pat. No. 4,314,827 (Leitheiser), U.S. Pat. No. 5,152,917 (Pieper et al.), U.S. Pat. No. 5,213,591 (Celikkaya et al.), U.S. Pat. No. 5,435,816 (Spurgeon et al.), U.S. Pat. No. 5,672,097 (Hoopman et al.), U.S. Pat. No. 5,946,991 (Hoopman et al.), U.S. Pat. No. 5,975,987 (Hoopman et al.), and U.S. Pat. No. 6,129,540 (Hoopman et al.), and in U.S. Publ. Pat. Appln. Nos. 2009/0165394 A1 (Culler et al.) and 2009/0169816 A1 (Erickson et al.).

The abrasive particles may be shaped (e.g., precisely-shaped) or random (e.g., crushed). Shaped abrasive particles may be prepared by a molding process using sol-gel technology as described in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina particles that have been formed in a specific shaped, and then crushed to form shards that retain a portion of their original shape features. In some embodiments, the abrasive particles are precisely-shaped (i.e., the abrasive particles have shapes that are at least partially determined by the shapes of cavities in a production tool used to make them). Exemplary shapes of shaped abrasive particles include crushed, pyramids (e.g., 3-, 4-, 5-, or 6-sided pyramids), truncated pyramids (e.g., 3-, 4-, 5-, or 6-sided truncated pyramids), cones, truncated cones, rods (e.g., cylindrical, vermiform), and prisms (e.g., 3-, 4-, 5-, or 6-sided prisms).

Details concerning such abrasive particles and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat. Appl. Publ. Nos. 2012/0227333 (Adefris et al.); 2013/0040537 (Schwabel et al.); and 2013/0125477 (Adefris).

In the manufacture of coated abrasive articles of the invention, the coatable, thermally curable binder precursor solutions of this invention, when cured, can be used as a treatment coating for the backing, e.g., cloth, paper, or plastic sheeting, to saturate or provide a back coating (backsize coating) or front coating (presize coating) thereto, as a make coating to which abrasive grains are initially anchored, as a size coating for tenaciously holding abrasive grains to the backing, or for any combination of the aforementioned coatings. In addition, the coatable, thermally curable binder precursor solutions of this invention, when cured, can be used in coated abrasive article embodiments where only a single-coating binder is employed, i.e., where a single coating takes the place of a make coating/size coating combination.

When the coatable, thermally curable binder precursor solutions of the present invention are applied to backing in one or more treatment steps to form a treatment coating, the treatment coating can be cured thermally by passing the treated backing over a heated drum; there is no need to festoon cure the backing in order to set the treatment coating or coatings. After the backing has been properly treated with a treatment coating, the make coating can be applied. After the make coating is applied, the abrasive grains are applied over the make coating. Next, the make coating, now bearing abrasive grains, is exposed to a heat source, and, optionally, to a radiation source, which generally solidifies or sets the binder sufficiently to hold the abrasive grains to the backing. It is preferable to use only the heat source to set the make coating unless ethylenically unsaturated monomers are present. Then the size coating is applied, and the size coating/abrasive grain/make coating combination is exposed to a heat source, preferably via a drum cure. This process will substantially cure or set the make and size coating used in the coated abrasive constructions.

The coatable, curable binder, when cured, only need to be in at least one of the binder layers, i.e., treatment coating, make coating, size coating, comprising the coated abrasive article. It does not need to be in every binder layer; the other binder layers can utilize various other binders known in the art, such as epoxy resin-based binders. If the binder of the present invention is in more than one layer, the curing conditions do not need to be the same for curing each layer of the coated abrasive.

Further details concerning the manufacture of coated abrasive articles according to the present disclosure can be found in, for example, U.S. Pat. No. 4,314,827 (Leitheiser et al.), U.S. Pat. No. 4,652,275 (Bloecher et al.), U.S. Pat. No. 4,734,104 (Broberg), U.S. Pat. No. 4,751,137 (Tumey et al.), U.S. Pat. No. 5,137,542 (Buchanan et al.), U.S. Pat. No. 5,152,917 (Pieper et al.), U.S. Pat. No. 5,417,726 (Stout et al.), U.S. Pat. No. 5,573,619 (Benedict et al.), U.S. Pat. No. 5,942,015 (Culler et al.), and U.S. Pat. No. 6,261,682 (Law).

It is also contemplated that cured versions of the curable binder compositions can be employed as a binder for nonwoven abrasive products. Nonwoven abrasive products typically include an open, porous, lofty, mat of fibers having abrasive grains bonded thereto by a binder. In one preferred embodiment, the method comprises combining a 30-95% solids solution of a thermally curable resin with a reactive diluent, as above described, to form a coatable, thermally curable binder precursor solution, adding abrasive grains to the coatable, thermally curable binder precursor solution, coating the abrasive-filled, coatable, thermally curable binder precursor solution onto at least a portion of the fibers of a lofty, open fibrous mat, and subjecting the resulting structure to conditions sufficient to affect curing of the binder precursor solution, preferably heat. Optionally, additional abrasive grains may be applied prior to curing the binder precursor solution, for example, by electrostatic precipitation or electrospray methods. A suitable electrospray coating process is described in U.S. Pat. No. 4,748,043, incorporated by reference herein.

Further details concerning the manufacture of abrasive articles according to the present disclosure can be found in, for example, U.S. Pat. No. 2,958,593 (Hoover et al.), U.S. Pat. No. 4,018,575 (Davis et al.), U.S. Pat. No. 4,227,350 (Fitzer), U.S. Pat. No. 4,331,453 (Dau et al.), U.S. Pat. No. 4,609,380 (Barnett et al.), U.S. Pat. No. 4,991,362 (Heyer et al.), U.S. Pat. No. 5,554,068 (Carr et al.), U.S. Pat. No. 5,712,210 (Windisch et al.), U.S. Pat. No. 5,591,239 (Edblom et al.), U.S. Pat. No. 5,681,361 (Sanders), U.S. Pat. No. 5,858,140 (Berger et al.), U.S. Pat. No. 5,928,070 (Lux), U.S. Pat. No. 6,017,831 (Beardsley et al.), U.S. Pat. No. 6,207,246 (Moren et al.), and U.S. Pat. No. 6,302,930 (Lux).

Cured binders can also be used to make bonded abrasive products. Bonded abrasive products typically consist of a shaped mass of individual or agglomerated abrasive grains held together by an organic or ceramic binder material. The shaped, cured mass is preferably in the form of a grinding wheel. However, it is not necessary to place the binder precursor solution and abrasive grains into a mold prior to curing the binder precursor. For example, the binder precursor and abrasive grains may be poured onto a surface and cured into a flat sheet of bonded abrasive.

Further details concerning the manufacture of bonded abrasive articles according to the present disclosure can be found in, for example, U.S. Pat. No. 4,800,685 (Haynes et al.); U.S. Pat. No. 4,898,597 (Hay et al.); U.S. Pat. No. 4,933,373 (Moren); and U.S. Pat. No. 5,282,875 (Wood et al.).

EXAMPLES

Except where specified to the contrary, amounts are given in equivalents (eq). Equivalents are based on the moles of reactive groups per mole of reactant molecule. Hence, 2 equivalents of a bifunctional reactant represented one mole of that reactant, and one mole of a trifunctional reactant represented 3 eq of that reactant. Catalysts were treated as if monofunctional.

Abbreviations Employed

RESIN-1: HRJ 12952 HIGH MOLECULAR WEIGHT NOVOLAC resin manufactured by SI Group, Schenectady, N.Y.

RESIN-2: DYNEA 5136G, a low molecular weight resole, from Dynea Oy Corp., Helsinki, Finland.
CAT-1: elemental iodine ($I_2$)
CAT-2: elemental bromine ($Br_2$)
CAT-3: benzyltrimethylammonium tribromide, from Sigma-Aldrich, St. Louis, Mo.
CCAT-1: hexamethylene tetramine, from Sigma-Aldrich, St. Louis, Mo.
CCAT-2: oxalic acid dihydrate
Phenol: available from Alfa Aesar, a Johnson Matthey Company, Haverhill, Mass.
Test Methods
Method of Measuring a Cure Reaction Exotherm Via Differential Scanning Calorimeter (DSC)

A TA INSTRUMENTS Q SERIES DSC (obtained from TA Instruments, New Castle, Del.) equipped with an auto sampler was used. Aliquots of 1-4 mg of resin were weighed into an aluminum DSC pan. The sample pan was loaded into the DSC instrument and heated at 1° C./min with a modulated signal superimposed at ±0.159° C. per 60 sec, starting from 0° C. up to 300° C. The results for DSC testing of the Examples below were as summarized in Table 1.

Example 1 (EX-1)

1 gram of CAT-1 in 20 grams RESIN-1 were finely ground together and a 0.0040 gram aliquot was heated inside a hermetically sealed pan in TA differential scanning calorimeter at the rate of 1° C./min modulated at ±0.159° C. per 60 sec, starting from 0° C. and up to 300° C. The modulated DSC trace of non-reversing energy revealed a broadly defined exotherm with a temperature peak at approximately 117° C. and an onset at approximately 94° C. The total energy released during the cure was 195 J/gram. At 135° C., the cure exotherm transitioned to an endotherm with minimum at 140° C. associated with water loss.

Comparative Example 1 (CE-1)

1 gram of CCAT-1 in 20 grams RESIN-1 were finely ground together and a 0.0016 gram aliquot was heated inside a hermetically sealed pan in TA differential scanning calorimeter at the rate of 1° C./min modulated at ±0.159° C. per 60 sec, starting from 0° C. and up to 300° C. The modulated DSC trace of non-reversing energy revealed a broadly defined exotherm with a temperature peak at approximately 127° C. and an onset at approximately 118° C. The total energy released during the cure was 51 J/gram.

The cures for Example 1 and CE-1 are characterized by a small endotherm associated with the melting of the resin. Those minima were at temperatures of 54° C. and 60° C. for the CE-1 and EX-1, respectively. Similarly, the energy consumed by the melting process was 45 J/g, 49 J/g and 56 J/g, respectively.

Preparative Example 1 (PE-1)

9.41 grams of phenol (100 mmol) were mixed with 3.00 grams of paraformaldehyde (1 mol. equiv.) while heated at 110° C. for 30 minutes. The mixture was allowed to cool to room temperature.

Comparative Example 2 (CE-2)

0.25 g CCAT-2 was dissolved in 5.00 g of the mixture from PE-1, and a 4.98 mg aliquot was heated inside an aluminum pan in TA Q2000 differential scanning calorimeter at the rate of 1° C./min with a modulated signal superimposed at ±0.159° C. per 60 sec, starting from 0° C. up to 200° C. The modulated DSC trace of heat flow versus temperature revealed no exotherm, but a broadly defined endotherm with an onset temperature of 69° C. and minima at 86° C. The total energy absorbed during the events was 288 J/gram.

Example 2 (EX-2)

0.25 g CAT-1 was dissolved in 5.00 g of the mixture from PE-1, and a 2.58 mg aliquot was heated inside an aluminum pan in TA Q2000 differential scanning calorimeter at the rate of 1° C./min with a modulated signal superimposed at ±0.159° C. per 60 sec, starting from 0° C. up to 200° C. The modulated DSC trace of heat flow versus temperature revealed an exotherm with an onset temperature of 2° C. and minima at 55° C. The total energy released during the exotherm was 341 J/gram.

Example 3 (EX-3)

A sample composition from Example 2 was heated to 100° C. and held at that temperature for 2 minutes, resulting in a visible exotherm accompanied by aggressive bubbling (evaporation of the water of condensation). The product was then dissolved in deuterated dimethyl sulfoxide (dmso-d6) and the soluble portion (about ⅔, visually) was analyzed using proton, carbon, single- and multi-bond correlation NMR. The resulting spectra suggested the appearance of several methylene bridged phenolic species in addition to the disappearance of the starting monomers. The species of even multiplicity with resonances in the 3-4 ppm region in the proton dimension of HSQC corresponded to the familiar methylene bridges between the phenolic rings (p,p' for contours with 3.9/40 ppm $^1H/^{13}C$ coordinates and o,p' for the 3.8/35 ppm $^1H/^{13}C$ coordinates). The species with odd multiplicity contour with 2.5 ppm/40 ppm signals corresponded to the dimethylsulfoxide solvent. The rest of the odd multiplicity $^1H$ signals in the 6.5-7.2 ppm range corresponded to the aromatic phenol protons and the signals in the 9.0 to 9.5 ppm range were associated with the phenolic hydroxyl —OH's.

Example 4 (EX-4)

50 mL of a 20 weight percent solution of elemental bromine (CAT-2) in dichloromethane were stirred in with the mixture of 9.4 grams phenol and 3.0 grams of paraformaldehyde in a round bottom flask. The mixture was heated to 60° C. to distill off the solvent and then held at 100° C. for additional 10 minutes. An aliquot of the resulting polymer was dissolved in deuterated dimethyl sulfoxide (dmso-d6) and the soluble portion was analyzed using proton, carbon, single- and multi-bond correlation NMR. The resulting spectra suggested the appearance of several methylene bridged phenolic species in addition to the disappearance of the starting monomers. The species of even multiplicity with resonances in the 3-4 ppm region in the proton dimension of HSQC corresponded to the familiar methylene bridges between the phenolic rings (p,p' for contours with 3.9/40 ppm $^1H/^{13}C$ coordinates and o,p' for the 3.8/35 ppm $^1H/^{13}C$ coordinates). The species with odd multiplicity contour with 2.5 ppm/40 ppm signals corresponded to the dimethylsulfoxide solvent. The rest of the odd multiplicity $^1H$ signals in the 6.5-7.2 ppm range corresponded to the aromatic phenol protons and the signals in the 9.0 to 9.5 ppm range were associated with the phenolic hydroxyl —OH's.

Example 5 (EX-5)

0.5 grams of CAT-3 were stirred into 10 grams of stock mixture from PE-1 that was preheated to 100° C. until fully dissolved and held at that temperature for 2 minutes, resulting in a visible exotherm accompanied by aggressive bubbling (evaporation of water of condensation). An aliquot of the resulting polymer was dissolved in deuterated dimethyl sulfoxide (dmso-d6) and the soluble portion was analyzed using proton, carbon, single- and multi-bond correlation NMR. The resulting spectra suggested the appearance of several methylene bridged phenolic species in addition to the disappearance of the starting monomers. The species of even multiplicity with resonances in the 3-4 ppm region in the proton dimension of HSQC corresponded to the familiar methylene bridges between the phenolic rings (p,p' for contours with 3.9/40 ppm $^1H/^{13}C$ coordinates and o,p' for the 3.8/35 ppm $^1H/^{13}C$ coordinates). The species with odd multiplicity contour with 2.5 ppm/40 ppm signals corresponded to the dimethylsulfoxide solvent. The odd multiplicity contour at 3.0 ppm/52 ppm coordinates in the $^1H/^{13}C$ dimension were associated with the trimethyl groups of CAT-3. The even multiplicity contour at 4.6 ppm/68 ppm coordinates in the $^1H/^{13}C$ dimension corresponded to the benzyl methylene group of CAT-3. The rest of the odd multiplicity 41 signals in the 6.5-7.2 ppm range corresponded to the aromatic phenol protons and the signals in the 9.0 to 9.5 ppm range were associated with the phenolic hydroxyl —OH's.

Example 6 (EX-6)

2 grams of CAT-3 were ground together with 4 grams of paraformaldehyde into a fine stock powder. 0.15 grams of that powder were blended together with 0.85 grams of RESIN-1 and a 0.0028 g aliquot was heated inside a hermetically sealed pan in TA differential scanning calorimeter at the rate of 1° C./min modulated at ±0.159° C. per 60 sec, starting from 0° C. and up to 300° C. The modulated DSC trace of non-reversing energy revealed a broadly defined exotherm with temperature peak at approximately 125° C. and an onset at approximately 110° C. The total energy released during the cure was 233 J/gram. At 56° C., the trace has a slight endotherm, associated with the resin melt and at 245° C., the curve transitioned to an endotherm associated with water loss.

Comparative Example 3 (CE-3)

1 gram of molten phenol was dissolved in 3 grams of RESIN-2, and a 0.0029 gram aliquot was heated inside a hermetically sealed pan in TA differential scanning calorimeter at the rate of 1° C./min modulated at ±0.159° C. per 60 sec, starting from 0° C. and up to 300° C. The modulated DSC trace of non-reversing energy revealed a broadly defined exotherm with onset at 110° C. and maximum at 130° C. The total energy released was 260 J/g. That event was followed by an endotherm, associated with the escape of the water of condensation from the sealed pan (minimum at 174° C.).

Example 7 (EX-7)

0.4 grams CAT-1 were stirred into 1 gram of molten phenol and that mixture was then dissolved in 3 grams of RESIN-2. A 0.0027 gram aliquot was heated inside a hermetically sealed pan in TA differential scanning calorimeter at the rate of 1° C./min modulated at ±0.159° C. per 60 sec, starting from 0° C. and up to 300° C. The modulated DSC trace of non-reversing energy revealed a broadly defined exotherm with onset at 23° C. and maximum at 64° C. The total energy released was 563 J/g. That event was followed by an endotherm, associated with the escape of the water of condensation from the sealed pan (minimum at 200° C.).

Example 8 (EX-8)

The reaction mixture from Example 7 was heated to 120° C. on a hotplate and held at that temperature for 10 minutes. The liquid mixture thickened and then slowly solidified, accompanied by some foaming. A 0.200 gram aliquot of the product was dissolved in 5 mL of deuterated dmso-d6 and analyzed using proton, carbon, single- and multi-bond correlation NMR. The resulting spectra suggested the appearance of several methylene bridged phenolic species in addition to the disappearance of the starting monomers. The species of even multiplicity with resonances in the 3-4 ppm region in the proton dimension of HSQC corresponded to the familiar methylene bridges between the phenolic rings (p,p' ppm $^1$H/$^{13}$C contours with 3.9/40 ppm $^1$H/$^{13}$C coordinates and o,p' for the 3.8/35 coordinates). The species with odd multiplicity contour with 2.5 ppm/40 ppm signals corresponded to the dimethylsulfoxide solvent. The rest of the odd multiplicity $^1$H signals in the 6.5-7.2 ppm range corresponded to the aromatic phenol protons and the signals in the 9.0 to 9.5 ppm range were associated with the phenolic hydroxyl —OH's.

TABLE 1

Summary of modulated DSC results for the listed Examples

| Example | Resin | Catalyst | Onset Temperature, ° C. | Temperature Extrema, ° C. | Total Heat Flow*, J/gram |
| --- | --- | --- | --- | --- | --- |
| EX-1 | RESIN-1 | CAT-1 | 94 | 117 | 195 |
| CE-1 | RESIN-1 | CCAT-1 | 118 | 127 | 51 |
| CE-2 | PE-1 | CCAT-2 | 69 | 86 | −288 |
| EX-2 | PE-1 | CAT-1 | 2 | 55 | 341 |
| EX-6 | RESIN-1 | CAT-3 | 110 | 125 | 233 |
| CE-3 | RESIN-2 | none | 110 | 130 | 260 |
| EX-7 | RESIN-2 | CAT-1 | 23 | 64 | 563 |

*Positive values indicate exothermic events and negative values indicate endothermic events.

What is claimed is:

1. A curable composition comprising:
   a) a phenolic composition; and
   b) an onium polyhalide,
   wherein the phenolic composition is selected from:
   1) a phenol and an aldehyde equivalent,
   2) a novolac and an aldehyde equivalent,
   3) a resole and optionally an aldehyde equivalent; or
   4) mixtures thereof,
      wherein the onium polyhalide is of the formula Q+X(2n+1)−, where 1≤n≤4,
      Q is onium group, selected from ammonium, sulfonium and phosphonium; and
      X is a halide, and
   wherein Q is a pyridinium, pyrrolidinium or imidazolium group.

2. The curable composition of claim 1 wherein the phenolic composition comprises the resole or the novolac phenolic resin.

3. The curable composition of claim 1 where the phenolic composition is monohydric, dihydric, or polyhydric phenol.

4. The curable composition of claim 1 wherein the aldehyde equivalent is selected from the group consisting of formalin, formaldehyde, methylformcel, butylformcel, acetaldehyde, propionaldehyde, butyraldehyde, crotonaldehyde, valeraldehyde, caproaldehyde, heptaldehyde, benzaldehyde, paraformaldehyde, trioxane, furfural, metaformaldehyde, hexamethylenetetramine, aldol, β-hydroxybutyraldehyde, and acetals, ketals and trimers thereof, and mixtures of aldehydes.

5. The curable composition of claim 1 wherein the onium polyhalide is used in 0.5 to 20% by mass relative to the total composition.

6. The curable composition of claim 1 wherein Q is a pyridinium, pyrrolidinium or imidazolium group of the formulas:

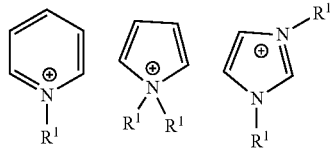

wherein each $R^1$ is independently H, alkyl, aryl, or combinations thereof with the proviso that no more than one $R^1$ is H.

7. An abrasive article comprising a plurality of abrasive grains dispersed and adhered within a binder, the binder formed from the curable composition of claim 1.

8. The abrasive article of claim 7, wherein the abrasive article is a bonded, coated or nonwoven abrasive article.

9. A curable composition comprising:
   a) a phenolic composition; and
   b) an onium polyhalide,
   wherein the phenolic composition is selected from:
   1) a phenol and an aldehyde equivalent,
   2) a novolac and an aldehyde equivalent,
   3) a resole and optionally an aldehyde equivalent; or
   4) mixtures thereof,
      wherein the onium polyhalide is of the formula Q+X(2n+1)−, where 1<n<4,
      Q is onium group, selected from ammonium, sulfonium and phosphonium; and
      X is a halide, and
   wherein Q is $(R^1)_4N^+$, wherein each $R^1$ is independently H, alkyl, aryl, or combinations thereof with the proviso that no more than one $R^1$ is H.

10. A curable composition comprising:
    a) a phenolic composition; and
    b) an onium polyhalide,
    wherein the phenolic composition is selected from:
    1) a phenol and an aldehyde equivalent,
    2) a novolac and an aldehyde equivalent,
    3) a resole and optionally an aldehyde equivalent; or
    4) mixtures thereof,
       wherein the onium polyhalide is of the formula Q+X(2n+1)−, where $1<n<4$,
Q is onium group, selected from ammonium, sulfonium and phosphonium; and
X is a halide, and
wherein subscript n is 2.

* * * * *